United States Patent
Nomura

(10) Patent No.: US 6,203,896 B1
(45) Date of Patent: Mar. 20, 2001

(54) IMAGE TRANSFER SHEET AND METHOD THEREOF

(75) Inventor: Hiroyasu Nomura, Ichinomiya (JP)

(73) Assignee: Maryland China Company, Reisterstown, MD (US)

( * ) Notice: Subject to any disclaimer, the term of this patent is extended or adjusted under 35 U.S.C. 154(b) by 0 days.

(21) Appl. No.: 09/156,577

(22) Filed: Sep. 18, 1998

(51) Int. Cl.$^7$ ........................................... B32B 5/16
(52) U.S. Cl. ................ 428/332; 428/195; 428/913; 428/914; 428/343; 428/334; 428/335; 428/336
(58) Field of Search .................... 428/195, 913, 428/914, 213, 332, 343, 334, 335, 336

(56) References Cited

U.S. PATENT DOCUMENTS

| | | | |
|---|---|---|---|
| 4,021,591 | * 5/1977 | DeVries et al. | 428/200 |
| 4,927,666 | * 5/1990 | Kawasaki et al. | 427/146 |
| 5,362,703 | * 11/1994 | Kawasaki et al. | 503/227 |
| 5,576,264 | * 11/1996 | Ueno et al. | 503/227 |
| 5,654,036 | * 8/1997 | Sugiura | 427/264 |
| 5,710,098 | * 1/1998 | Asajima et al. | 503/227 |
| 5,741,387 | * 4/1998 | Coleman | 156/240 |
| 5,856,267 | * 1/1999 | Sherman et al. | 503/227 |
| 5,891,826 | * 4/1999 | Tsaur | 503/227 |
| 5,932,053 | * 8/1999 | Asajima et al. | 156/235 |
| 5,932,352 | * 8/1999 | Higgins | 428/423.1 |
| 5,958,560 | * 9/1999 | Ewan | 428/201 |

\* cited by examiner

*Primary Examiner*—Bruce H. Hess
*Assistant Examiner*—B. Shewareged
(74) *Attorney, Agent, or Firm*—David L. Marks

(57) ABSTRACT

An image transfer sheet and method is provided for transferring an image of the original to a hard target body made of metal, glass, ceramics, plastics, or similar materials. The image transfer sheet has a support base and a synthetic resin layer detachably bound thereon, preferably a water-soluble resin layer in between. The synthetic resin layer has a thickness in the range of 10 to 500 $\mu$m, and preferably includes a first layer that is adhesive to the hard target body, and a second layer that is fixedly receivable active toner of electrostatic process copying machine or printers. First, by means of an electrostatic process copying machine or electrostatic printer, an image is transferred to the synthetic resin layer of the image transfer sheet, which is then released from the support base and applied to the target body. Consequently, the target body which now has the image transfer layer thereon is dried or heated to fixate the image transfer layer.

4 Claims, 3 Drawing Sheets

IMAGE TRANSFER SHEET AND METHOD THEREOF

STATEMENT REGARDING FEDERALLY SPONSORED RESEARCH OR DEVELOPMENT

Not Applicable

CROSS-REFERENCE TO RELATED APPLICATIONS

Not Applicable

REFERENCE TO MICROFICHE APPENDIX

Not Applicable

BACKGROUND OF INVENTION

1. Field of the Invention

This invention relates to an image transfer sheet and method for transferring patterns, designs, photograph, and other images of an original via transfer paper onto metal, glass, ceramics, plastics, leather or other similar materials by means of an electrostatic process copying machine, electrostatic printer, hot-melt printer or sublimation printer. More specifically, this invention relates to such a method that is enhanced in its precision and definition, and also provided with facility in performing the transferring.

2. Description of the Related Art

A variety of methods have been proposed to transfer images of an original to metal, glass, ceramics, plastics and other materials, including screen process printing that is most widely adopted. These printing methods, however, fall short in cost effectiveness, especially when transferring a small number of images because they require an expensive, dedicated original for the transferring. Moreover, the plate making process for the original is time consuming, thus prolonging the overall process time to obtain the final product.

In order to solve the described shortcoming, a system was developed which, by employing copying machines or various types of printers, is able to perform image transfer inexpensively and in an expedited manner. This system utilizes a heat transfer sheet having a support layer and a thermal adhesive layer, instead of conventional sheets for use with copying machines or printers. According to this system, the image of the original is transferred to the surface of the heat transfer sheet. Then, a target body for the image is brought into contact with the surface of the heat transfer sheet. The target body and the heat transfer sheet are heated and press-bonded to each other, thereby transferring the image from the heat transfer sheet to the target body, together with the thermal adhesive layer.

Because the described system utilizes a special heat pressing machine in press-bonding the heat transfer sheet to the target body, it does not meet general purposes. Besides, the productivity of this system is poor. Further, the molding shape of the heat pressing machine limits the outer profile of the target body to which the image will be transferred.

BRIEF SUMMARY OF THE INVENTION

An objective of the present invention is to provide an image transfer sheet and method for readily and inexpensively transferring the image of the original to a target body of various configurations without using special heat pressing machine.

In order to attain the stated objective, the image transfer sheet according to one aspect of the present invention includes a support base and synthetic resin layer detachably bound thereon. The synthetic resin layer has adhesive properties to adhere to a target body made of hard material, such as metal, glass, ceramics, leather, plastics, or similar materials. The synthetic resin layer is capable of binding with the toner of electrostatic process copying machine or electrostatic printer, and is of a thickness in the range of 10 to 500 ,m.

In another aspect of the invention, a water-soluble resin layer is interposed between the support base and the synthetic resin layer, such that when the image transfer sheet is immersed in water, the water-soluble resin layer is dissolved to release more easily the support base from the synthetic resin layer.

In still another aspect of the invention, the described synthetic resin layer that is detachably bound to the support base is a lamination of a first resin layer and a second resin layer, in which the first resin layer can adhere to the target body, and the second resin layer, laminated on the first resin layer, is capable of binding with the toner of electrostatic process copying machine or electrostatic printer. With such a double-layered construction, the synthetic resin layer has increased adhesion to the target body and more secure binding to the toner.

In still further aspect of the invention, the image transfer sheet further includes a water-soluble resin layer that is interposed between the support base and the first resin layer, such that when the image transfer sheet is immersed in water, the water-soluble resin layer is dissolved to readily release the image transfer sheet from the support base.

In still another aspect of the invention, a method is provided for transferring an image to a target body. The method includes the step of preparing an image transfer sheet having a support base and a synthetic resin layer of 10 to 500 $\mu$m thickness detachably bound thereon. The synthetic resin layer has the adhesive properties to adhere to the target body which can be made of metal, glass, ceramics, leather, plastics, or similar materials, and is capable of binding the toner of electrostatic process copying machine and electrostatic printer. The method also includes the steps of feeding the image transfer sheet into an electrostatic process copying machine or electrostatic printer; transferring a given image onto the image transfer sheet; binding the toner of electrostatic process copying machine or electrostatic printer on the synthetic resin layer, thereby forming an image transfer layer which is the synthetic resin layer and the toner bound to the synthetic resin layer; releasing the image transfer layer from the support base; applying the released image transfer layer to the target body; and drying or heating the target body, with the image transfer layer thereon, to fixate the image transfer layer on the target body.

In still further aspect of the invention, the method described above further includes the steps of interposing a water-soluble resin layer between the support base and the synthetic resin layer, transferring an image to the synthetic resin layer of the image transfer sheet by means of an electrostatic process copying machine or electrostatic printer; and immersing the image transfer sheet in water to dissolve the water-soluble resin layer and thereby release the image transfer layer from the support base.

In still further aspect of the invention, the method described above further includes the step of preparing a synthetic resin layer comprised of a first resin layer and a second resin layer laminated together, in which the first resin layer is adhesive to the target body, and the second resin layer is capable of binding with the toner of electrostatic process copying machine or electrostatic printer. The method also includes the steps of transferring an image onto the second resin layer by means of an electrostatic process copying machine or electrostatic printer; and releasing the first resin layer, together with the second resin layer, from the support base.

In still another aspect of the invention, the method described above includes the steps of interposing a water-soluble resin layer between the support base and the first resin layer; transferring an image onto the second resin layer by means of an electrostatic process copying machine or electrostatic printer; and immersing the image transfer sheet in water to dissolve the water-soluble resin layer and thereby release the image transfer layer from the support base.

The above description summarizes the invention. The specific details as to how the invention is constructed and operates will become apparent upon review of the following description which is to be read in conjunction with the accompanying drawings.

BRIEF DESCRIPTION OF THE SEVERAL VIEWS OF THE DRAWING(S)

In the drawings, like reference numerals and letters refer to like parts throughout the various views, and wherein.

DETAILED DESCRIPTION OF THE INVENTION

Three embodiments of the method according to the present invention will now be described with reference to the attached drawings. It should be noted, however, the following description is not to be taken in a limiting sense.

Figure 1:
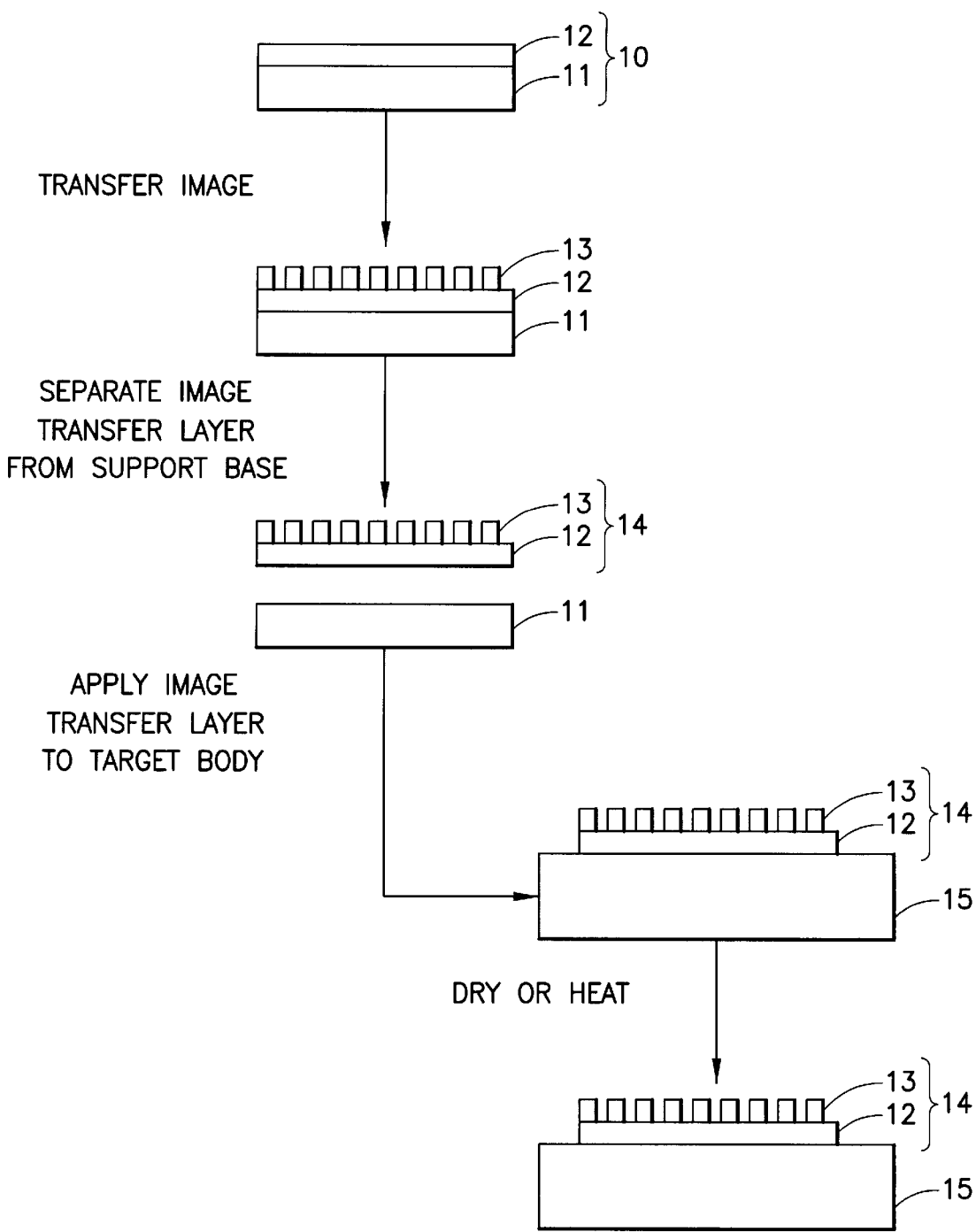
FIG. 1 is a side view illustrating the process steps of transferring an image to a target body according to a first embodiment of the present invention.
Figure 2:
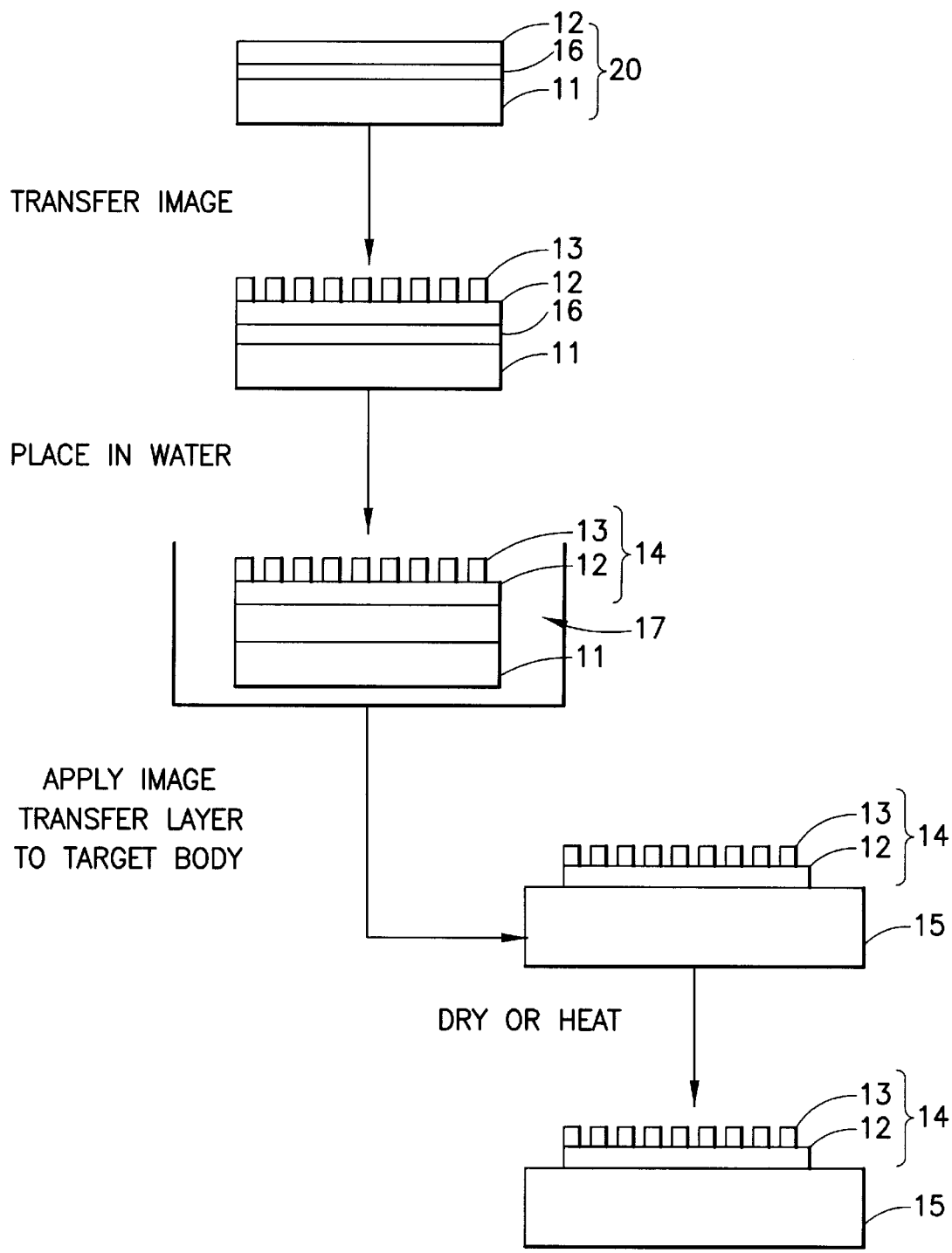
FIG. 2 is a side view illustrating the process steps of transferring an image to a target body according to a second embodiment of the present invention.
Figure 3:
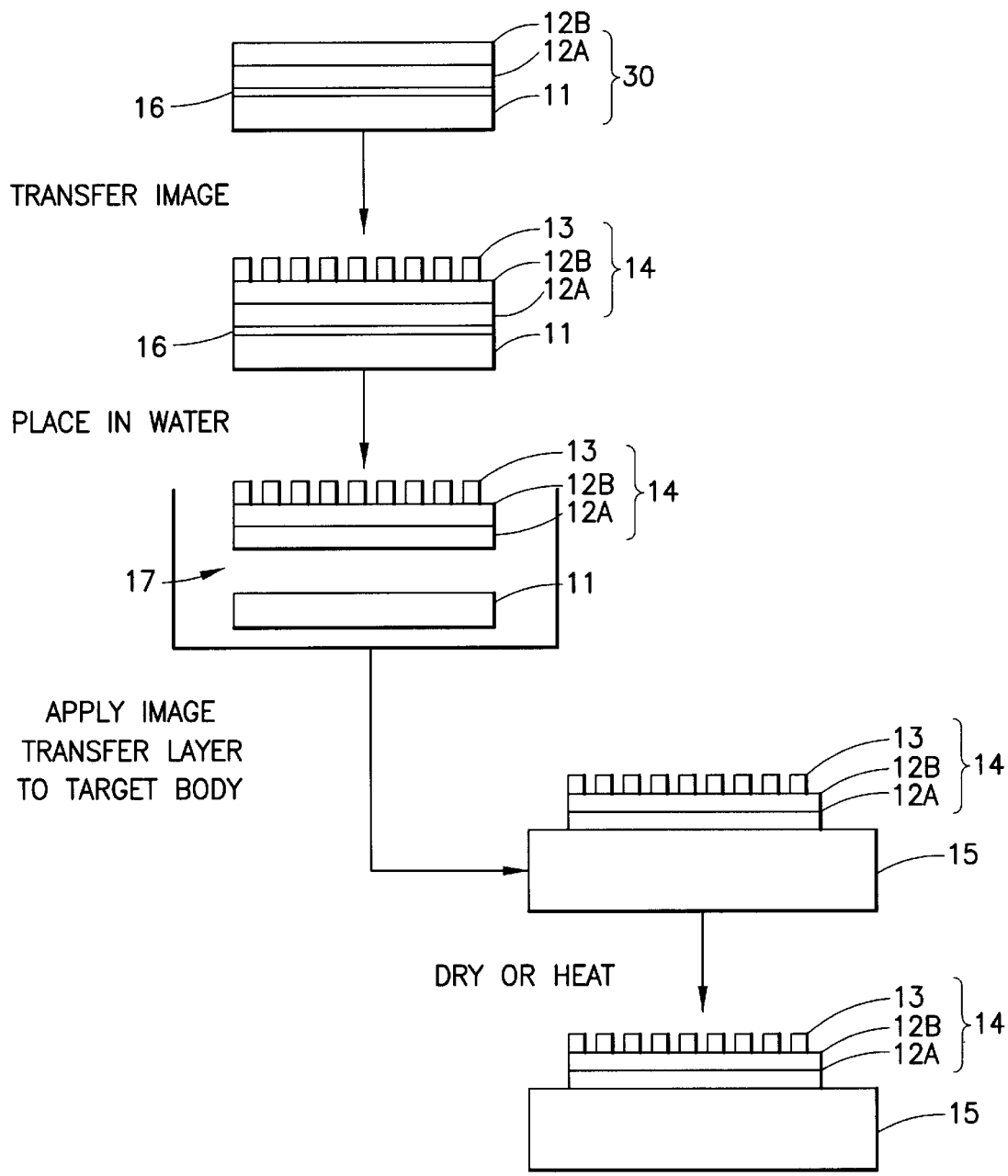
FIG. 3 is a side view illustrating the process steps of transferring an image to a target body according to a third embodiment of the present invention.

Throughout the embodiments in FIGS. 1, 2, and 3, an image transfer sheet, 10, 20, and 30, according to the present invention includes a support base, 11, and a synthetic resin layer, 12, detachably bound together. Directing attention to FIG. 2, a water-soluble resin layer, 16, may be interposed between the support base, 11, and the synthetic resin layer, 12.

In FIGS. 1, 2, and 3, the support base, 11, is made of paper, synthetic paper, chemical fiber paper, synthetic resin sheet, plastic film, or any similar type of material; one side of which is treated with substances to help release the synthetic resin layer, 12. Exemplary substances useful for such treatment include resins with a low boundary tension, such as polyethylene and polypropylene, and release agents such as silicone resin and fluoro resin. The support base, 11, has a thickness preferably in the range of 70 to 200 µm, more preferably of 80 to 160 µm. If the thickness of the support base, 11, is less than 50 µm, then the image transfer sheet, 10, 20, or 30, would have a poor rigidity and occasionally stick in the feeder mechanism of copying machine or printer.

The synthetic resin layer, 12, is preferably of a thickness in the range of 10 to 500 µm, more preferably of 30 to 150 µm in order to attain secure adhesion to a target body, 15, and also easy release from the support base, 11. If the thickness of the synthetic resin layer, 12, were out of the range of 10 to 500 µm, the image transfer sheet, 10, 20 or 30, may evade the effective capture of, and stick in the feeder mechanism of copying machine or printer.

The synthetic resin layer, 12, is required to have two properties. First, it must adhere to the target body, 15. Second, it must also be capable of binding the toner, 13, of a copying machine or printer. In two preferred embodiments (FIG. 1 and FIG. 2), the synthetic resin layer, 12, has both of the properties and is single layer. In another preferred embodiment (FIG. 3), the synthetic resin layer comprises two layers of resin (first resin layer, 12A, and second resin layer, 12B) which are bound together. The first resin layer, 12A, adheres to the target body while the second resin layer, 12B, binds the toner. In FIGS. 1 and 2, the synthetic resin layer, 12, is made of at least one of the following materials; polyester resin, acrylic resin, alkyd resin, melamine resin, alkyd melamine resin, acrylic resin, epoxy resin, urethane resin, phenol resin, phenoxy resin, vinyl chloride resin, olefin resin, cellulose resin, vinyl acetate resin, natural rubber, synthetic rubber, polyvinyl butyral resin, silicone resin, polyamide resin and the like. If desired, the synthetic resin layer, 12, may also contain tackifier, antioxidant, coloring agent, ultraviolet absorbent, wax, plasticizer, filler, antistatic agent and the like.

As shown in FIG. 3, when first resin layer, 12A, and the second resin layer, 12B, are lamined together to act as the synthetic resin layer, the first resin layer, 12A, is the layer that must adhere to the target body, 15. The first resin layer, 12A, is made of at least one of the following: urethane resin, phenoxy resin, polyester resin, acrylic resin, and epoxy resin. If desired, the first resin layer, 12A, may also contain tackifier, antioxidant, coloring agent, ultraviolet absorbent, wax, plasticizer, filler, antistatic agent and the like. The second resin layer, 12B, must bind the toner, 13, of electrostatic process copying machine or electrostatic printer, and is made of at least one of the following: polyester resin, alkyd resin, olefin resin, olefin resin, acrylic resin, urethane resin, vinyl chloride resin, natural rubber, synthetic rubber, phenol resin and the like. If desired, the second resin layer, 12B, may also contain antistatic agent, plasticizer, antioxidant, ultraviolet absorbent and the like.

In FIG. 1 and 2, the thickness of the synthetic resin layer, 12, is within the range of 10 to 500 µm, preferably of 15 to 100 µm, more preferably of 20 to 50 µm. If the thickness of the synthetic resin layer is less than 10 µm, the toner of electrostatic process copying machine or electrostatic printer may not bind to the synthetic resin layer. If the thickness of the synthetic resin layer, 12, is 500 µm or greater, the image transfer sheet, 10 or 20, may stick in the feeder mechanism of copying machine or printer, or the synthetic resin layer, 12, may be undesirably released during the image transfer process inside a copying machine or printer. In FIG. 3, the thickness of the first resin layer, 12A, is within the range of 10 to 50 µm, preferably of 15 to 100 µm, more preferably of 20 to 50 µm. If the thickness of the first resin layer, 12A, is 10 µm or less, the adhesion of the first resin layer, 12A, to the target body, 15, is insufficient. If the thickness of the first resin layer, 12A, is 500 µm or greater, the image transfer sheet, 30, may stick in the feeder mechanism of copying machine or printer, or the first resin layer, 12A, and the second resin layer, 12B, may undesirably be released during the image transfer process inside a copying machine or printer. The thickness of the second resin layer, 12B, is within the range of 10 to 500 µm, preferably of 15 to 100 µm, more preferably of 20 to 50 µm. If the second resin layer, 12B, has a thickness of less than 10 µm, it would fail to bind the toner, 13, of electrostatic process copying machine or electrostatic printer. If the thickness of the second resin layer, 12B, is 500 μm or greater, the image transfer sheet, 30, may stick in the feeder mechanism of copying machine or printer, or the first resin layer and second resin layer may undesirably be released during the image transfer process inside a copying machine or printer.

In FIG. 2, when the water-soluble resin layer, 16, is employed, exemplary material for forming the water-soluble resin layer, 16, includes carboxymethyl cellulose, polyvinyl alcohol, polyvinyl pyrrolidone and the like. The thickness of the water-soluble resin layer, 16, is selected within the range 0.1 to 30 μm.

In FIGS. 1, 2, 3, the target body, 15, is selected from the group consisting of metal, organic glass, inorganic glass, mirror, tableware, leather, ornaments or tiles made of earthenware, porcelain, ceramics, plastics, and the like. The surface of the target body, 15, may be any shape and configuration; it is not limited to a plane. For example, the target body may be moldings, a processed article, a container, and any three-dimensional object with irregular surfaces.

The image transfer method according to the present invention includes the step of making an image transfer sheet for use with electrostatic process copying machine, especially color copying machine, image transfer systems incorporating electrostatic color or monochromatic printer as an output unit of computers, and any similar image transfer systems.

According to the present method, the image transfer sheet 10, 20, or 30, is first cut to a predetermined size so that the image transfer sheet can be fed through a copying machine. The copying machine transfers an image onto the image transfer sheet, 10, 20, or 30, by applying the copier's toner, 13, onto the synthetic resin layer, 12. The toner on the synthetic resin layer and the synthetic resin layer, in combination, form an image transfer layer, 14. Subsequently, the image transfer layer, 14, is released from the support base, 11, for example by immersing the image transfer sheet, 20 and 30, in water, or by peeling the image transfer layer, 14, from the image transfer sheet, 10. The image transfer layer, 14, thus released is then applied to the target body, 15. After totally removing the air and/or water entrapped between the image transfer layer, 14, and the target body, 15, the target body is dried or heated to fixate the image transfer layer thereon. The temperature to be applied to the target body, 15, for fixating the image transfer layer, 14, depends on the particular composition of the synthetic resin layer, 12, but it is usually in the range of 20° C. to 250° C., preferably in the range of 70° C. to 200° C.

The electrostatic process copying machine or electrostatic printer to be employed in the present invention can be any commercially available one. In addition, ordinary ovens or microwave ovens for home use will suffice as the heater for fixating the image transfer layer, 14, on the target body, 15.

Embodiment 1

In FIG. 1, low density polyethylene was applied, via extrusion molding, onto a sheet of paper, thereby producing a support base, 11. The paper has a thickness of 100 μm. The low density polyethylene assists in the release of the support base from the synthetic resin layer. The low density polyethylene has a thickness of 10 μm. A synthetic resin layer, 12, having the composition indicated below was screen process-printed uniformly to a thickness of 30 μm on the support base, 11.

| Composition of the Synthetic Resin Layer | |
|---|---|
| Vinylchloride (of #1000, Denki Kagaku, Inc.) | 40 portion by weight |
| Tackifier (of SH6026, Tohrei DowCorning, Inc.) | 3 portion by weight |
| Solvent | 57 portion by weight |
| | 100 portion by weight in total |

The support base, 11, and synthetic resin layer, 12, was dried at 25° C. for four hours to produce an image transfer sheet, 10, having a support base, 11, and a synthetic resin layer, 12, detachably bound thereon.

The image transfer sheet, 10, was cut to A4 size and fed into a color copying machine, Color 930 of Fuji Xerox Inc. The color copying machine transferred an image onto the synthetic resin layer, 12, of the image transfer sheet, 10. In transferring the image, no paper sticking occurred. The color copying machine's toner, 13, and the synthetic resin layer bind together and form an image transfer layer, 14.

The image transfer sheet with the image already bond to it was cut to size to fit on a tile. The image transfer layer, 14, was detached via peeling from the support base, 11, and applied to a white tile, 15, such that the surface of the image transfer layer, 14, faced upward. The air entrapped between the image transfer layer and the white tile was totally removed. The white tile, 15, was then heated at 160° C. for fifteen minutes to fixate the image transfer layer, 14. The resultant product was a white tile with a finely defined image that fixedly adheres thereto.

Embodiment 2

In FIG. 2, a water-soluble resin layer, 16, was applied to the support base, 11, after the support base was made as in Embodiment 1. The water-soluble resin layer, having the composition indicated below, was screen process-printed uniformly to a thickness of 10 μm onto the support base and dried by air at room temperature.

| Composition of the Water-soluble Resin Layer | |
|---|---|
| Carboxylmethylcellulose (of Selogen7A, Daiichi Kogyo Seiyaku, Ltd.) | 10 portion by weight |
| Water | 90 portion by weight |
| | 100 portion by weight in total |

The synthetic resin layer, having the composition indicated below, was then screen process-printed to a thickness of 50 μm on the water-soluble resin layer, 16.

| Composition of the Synthetic Resin Layer | |
|---|---|
| Epoxy resin (of EOCN-102S, Nihon Kayaku, Ltd.) | 40 portion by weight |
| Hardener of aromatic group amine (of KayahardA-A, Nihon Kayak u, Ltd.) | 5 portion by weight |

-continued

| Composition of the Synthetic Resin Layer | |
|---|---|
| Toluene | 35 portion by weight |
| Cyclohexanone | 20 portion by weight |
| | 100 portion by weight in total |

The support base, 11; with the water-soluble resin layer, 16, and the synthetic resin layer, 12, detachably bound thereon; was dried at 25° C. for four hours to produce an image transfer sheet, 20.

The image transfer sheet, 20, was then cut to A4 size, and fed into a color copying machine, Color 930 of Fuji Xerox, Ltd. The color copying machine transferred an image onto the synthetic resin layer, 12. In transferring the image, no paper sticking occurred. The color copying machine's toner, 13, and the synthetic resin layer bind together and form an image transfer layer, 14.

The image transfer sheet with the image already bond to it was cut to size to fit on a tile. Subsequently, the image transfer sheet, 20, with the image thereon was immersed in water, 17, with a temperature of 20° C. for ten minutes. The water-soluble resin layer, 16, completely dissolved in the water, 17, and the image transfer layer, 14, now in the form of a thin film, was readily released from the support base, 11. The image transfer layer, 14, was then applied to a white tile, 15, such that the surface of the image transfer layer faced upward, as in Embodiment 1. The air entrapped between the image transfer layer, 14, and the tile, 15, was totally removed and the tile was heated at 160° C. for fifteen minutes to fixate the image transfer layer, 14. The resultant product was a white tile with a finely defined image that fixedly adhered thereto.

Embodiment 3

In FIG. 3, a support base, 11, was made as in Embodiment 1. A water-soluble resin layer, 16, having the composition indicated below, was screen process-printed uniformly to a thickness of 10 $\mu$m on the support base which is 100 $\mu$m thick. The support base and the water soluble resin layer were dried by air at room temperature.

| Composition of the Water-Soluble Resin Layer | |
|---|---|
| Maple gum | 10 portion by weight |
| Water | 90 portion by weight |
| | 100 portion by weight in total |

Subsequently, the first resin layer, 12A, having the composition indicated below and an adhesion to tiles, was screen process-printed uniformly to a thickness of 30 $\mu$m on the water-soluble resin layer, 16, and dried at 25° C. for four hours.

| Composition of the First Resin Layer | |
|---|---|
| Epoxy resin (of EOCN-102S, Nihon Kayaku, Ltd.) | 40 portion by weight |
| Hardener of aromatic group amine (of KayahardA-A, Nihon Kayaku, Ltd.) | 5 portion by weight |
| Toluene | 35 portion by weight |
| Cyclohexanone | 20 portion by weight |
| | 100 portion by weight in total |

Thus, a first resin layer, 12A, was formed on the water-soluble resin layer, 16.

Further, the second resin layer, 12B, having the composition indicated below and capable of binding color copier's toners, was then screen process-printed uniformly to a thickness of 30 $\mu$m on the first resin layer, 12A.

| Composition of the Second Resin Layer | |
|---|---|
| Acrylic resin (of Acrydic BZ-1160) | 40 portion by weight |
| Toluene | 35 portion by weight |
| Cyclohexanone | 25 portion by weight |
| | 100 portion by weight in total |

The support base, 11, with the water-soluble resin layer, 16, the first resin layer, 12A, and the second resin layer, 12B, detachable bound thereon, was dried at 25° C. for four hours. Thus, the second resin layer, 12B, was formed on the first resin layer, 12A, which was formed on the water-soluble resin layer, 16, which was formed on the support base, 11, thereby producing an image transfer sheet, 30. The second resin layer and the first resin layer are laminated together.

The image transfer sheet, 30, was then cut to A4 size, and fed into a color copying machine, Color 930 of Fuji Xerox, Ltd. The color copying machine transferred an image onto the second resin layer, 12B. In transferring the image, no paper sticking occurred. The first resin layer, 12A, the second resin layer, 12B, and the color copying machine's toner, 13, which is bound to the second resin layer form an image transfer layer, 14.

The image transfer sheet with the image already bond to it was cut to size to fit on a tile. Subsequently, image transfer sheet, 30, was immersed in water, 17, of 20° C. for ten minutes. As a result, the water-soluble resin layer, 16, was completely dissolved in the water, 17, and the image transfer layer, 14, now in the form of a thin film, was readily released from the support base, 11. The image transfer layer was then applied to a white tile, 15, such that the surface of the second resin layer, 12B, faced upward, similarly to the Embodiment 1. The air entrapped between the image transfer layer, 14, and the tile, 15, was totally removed, and the tile was heated at 160° C. for fifteen minutes for fixation. The resultant product was a white tile with a finely defined image that fixedly adhered thereto.

It is to be appreciated that changes could be made to the above design without departing from the spirit and scope of what is considered to be the invention. Consequently, what is considered to be the invention is limited solely by the subjoined claim or claims which follow, the interpretation of which is to be made in accordance with the established doctrines of patent claim interpretation.

Having described the present invention, the inventor claims:

1. An image transfer sheet essentially consisting of a support base and a synthetic resin layer detachably bound onto said support base, said synthetic resin layer having a thickness in the range of 10 to 500 $\mu$m and adhesive properties to adhere to a target body made of metal, glass, ceramics, leather, plastics, or similar material, said synthetic resin layer being capable of binding the toner of electrostatic process copying machine or electrostatic printer.

2. The image transfer sheet according to claim 1, further consisting of a water-soluble resin layer interposed between said support base and said synthetic resin layer.

3. The image transfer sheet according to claim 1, wherein said synthetic resin layer is a lamination of a first resin layer and second resin layer, said first resin layer being adhesive to a target body made of metal, glass, ceramics, leather or plastics, said second resin layer being capable of binding the toner of electrostatic process copying machine or electrostatic printer.

4. The image transfer sheet according to claim 3, further consisting of a water-soluble resin layer interposed between said support base and said first resin layer.

* * * * *